United States Patent
Gennaro et al.

(10) Patent No.: US 7,815,847 B2
(45) Date of Patent: Oct. 19, 2010

(54) MASS PRODUCTION OF TRIDIMENSIONAL ARTICLES MADE OF INTERMETALLIC COMPOUNDS

(75) Inventors: Paolo Gennaro, S. Pietro Mosezzo (IT); Giovanni Paolo Zanon, Rivalta di Torino (IT); Giuseppe Pasquero, Turin (IT)

(73) Assignees: Avio Investments S.p.A., Turin (IT); Avioprop S.r.l., S. Pietra Mosezzo (IT)

( * ) Notice: Subject to any disclaimer, the term of this patent is extended or adjusted under 35 U.S.C. 154(b) by 584 days.

(21) Appl. No.: 11/774,573

(22) Filed: Jul. 7, 2007

(65) Prior Publication Data

US 2008/0014457 A1  Jan. 17, 2008

(30) Foreign Application Priority Data

Jul. 14, 2006 (EP) ................................. 06425491
Nov. 21, 2006 (IT) .......................... MI2006A2228

(51) Int. Cl.
*C22C 33/02* (2006.01)
(52) U.S. Cl. ............... 419/25; 419/7; 419/30; 419/46; 264/308; 428/546; 219/121.21
(58) Field of Classification Search ............ 419/7, 419/25
See application file for complete search history.

(56) References Cited

U.S. PATENT DOCUMENTS

| 4,323,756 A | 4/1982 | Brown et al. |
| 4,863,538 A | 9/1989 | Deckard |
| 5,156,697 A | 10/1992 | Bourell et al. |
| 5,182,170 A | 1/1993 | Marcus et al. |
| 5,837,960 A | 11/1998 | Lewis et al. |
| 6,269,540 B1 | 8/2001 | Islam et al. |
| 2005/0186538 A1 | 8/2005 | Uckelmann |

FOREIGN PATENT DOCUMENTS

| EP | 0289116 A1 | 11/1988 |
| WO | WO 03/062491 A2 | 7/2003 |
| WO | 2004056511 A1 | 7/2004 |

OTHER PUBLICATIONS

D. Srivastava et al., "The Effect of process parameters and heat treatment on the microstructure of direct laser fabricated TiAl alloy samples," Intermetallics vol. 9 (2001) pp. 1003-1013.*

(Continued)

*Primary Examiner*—Roy King
*Assistant Examiner*—Christopher Kessler
(74) *Attorney, Agent, or Firm*—Hess Patent Law Firm, PC; Robert J. Hess

(57) ABSTRACT

A process for mass production of three-dimensional articles made of intermetallic compounds based on titanium and aluminium by an electron beam melting technology. The articles are produced in successive sections from powders of the intermetallic compound with which the articles are to be produced. For each section, melting of the powders preceded by a preheating step is performed.

16 Claims, 3 Drawing Sheets

OTHER PUBLICATIONS

Lewis G K et al: "Practical considerations and capabilities for laser assisted direct metal deposition" Materials and Design, London, GB, vol. 21, No. 4, 2000, pp. 417-423.

Abbott D H et al: "Laser Forming Titanium Components" Advanced Materials & Processes, ASM, Metals Park, Ohio, US, vol. 153, No. 5 May 1998, pp. 29-30.

Arcella F G et al: "Producing Titanium Aerospace Components From Powder Using Laser Forming" Jom, Minerals Metals & Materials Society, Warrendale, PA, US, vol. 52, No. 5, May 2000, pp. 28-30.

Database INSPEC [online] The Institution of Electrical Engineers, Stevenage, GB; Aug. 2000, Srivastava D et al: The optimisation of processing parameters and characterisation of microstructure of direct laser fabricated TiAl alloy components Database accession No. 6555781, Materials & Design, vol. 21, No. 4 2000, pp. 425-433.

Griffith M L et al: "Understanding the Microstructure and Properties of Components Fabricated by Laser Engineered Net Shaping (Lens)", Materials Research Society Symposium Proceedings, Materials Research Society, Pittsburg, PA, US, vol. 625, 2000, pp. 9-20.

* cited by examiner

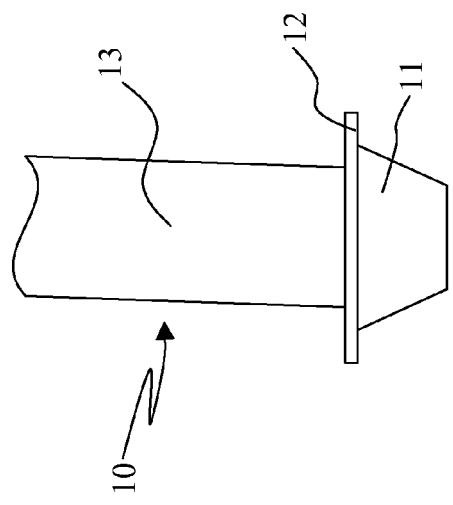
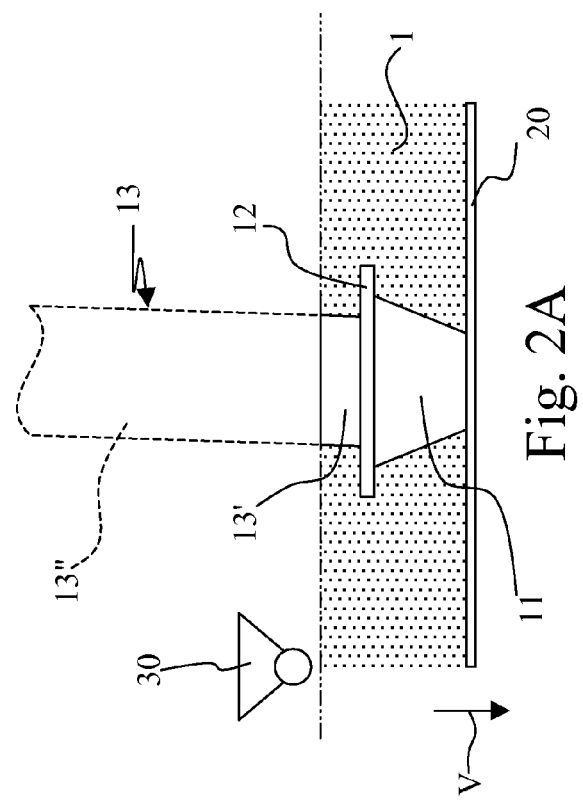
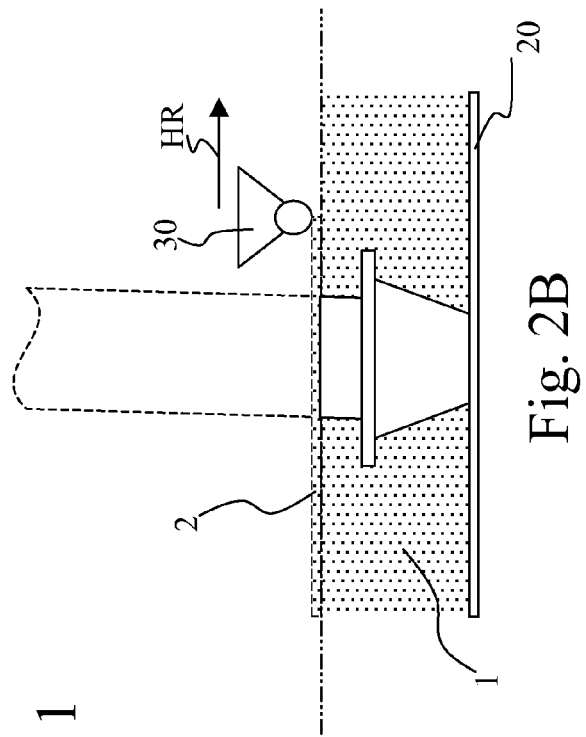

MASS PRODUCTION OF TRIDIMENSIONAL ARTICLES MADE OF INTERMETALLIC COMPOUNDS

REFERENCE TO FOREIGN PRIORITY DATA

The present application claims priority from European Patent Application No. 06425491.5 filed Jul. 14, 2006 and from Italian Patent Application No. MI2006A002228 filed Nov. 21, 2006.

BACKGROUND OF THE INVENTION

1. Field of the Invention

The present invention relates to a process for producing three-dimensional articles made of intermetallic compounds using a layer by layer technique. The process according to the present invention can be applied, for example, in the motor vehicle and/or aeronautical sector to produce specific components, such as valves for internal combustion engines, gas turbines, blades and/or impellers for turbo compressors or the like.

2. Discussion of Related Art

These types of components must have noteworthy properties of creep and fatigue strength at high temperatures. For these reasons, research is oriented towards various materials, in particular intermetallic compounds, capable of imparting the desired properties to each article produced.

Intermetallics are metal compounds whose crystal structures differ from those of the metals of which they are composed. This is a class of singular compounds that are composed of ordered phases of two or more metal materials whose atomic species occupy specific sites in the structure of the crystal. These compounds are formed because the strength of the bond between different atoms is greater than the one between identical atoms.

Intermetallic compounds differ considerably from conventional metal alloys. The latter are essentially formed of a disordered solid solution of one or more metallic elements, do not have a specific chemical formula and are described as being composed of a base material to which certain percentages of other elements have been added. The atoms of conventional alloys are bonded by relatively weak metallic bonds, with atomic nuclei floating in a "gas" of electrons which move relatively freely.

On the contrary, an intermetallic compound is a specific chemical compound based on a specific chemical formula, with a chemical composition that is fixed or in any case very limited in variability. The bonds in intermetallic compounds can be ionic or covalent, and therefore particularly strong. Alternatively, the bonds can also be entirely of the metal type, but the atoms of the single elements take preferred positions in the crystal structure.

These peculiarities reflect on the properties of intermetallic compounds, such as high melting point, noteworthy resistance to high temperatures but low ductility.

Titanium and aluminium intermetallic compounds, and in particular the compounds defined with the abbreviation $\gamma$TiAl ($\gamma$Titanium Aluminides), represent the group of intermetallics of most interest for application in the motor vehicle and aeronautical field due to their properties of low density and high resistance to high temperatures. This group of intermetallics includes $\gamma$TiAl compounds with tetragonal $LI_0$ ordered structure with centred faces, and compounds defined with the abbreviation $\alpha_2Ti_3Al$ with hexagonal $DO_{19}$ ordered structure. In conditions of thermodynamic equilibrium, the $\gamma/\alpha_2$ volume ratio is controlled on the basis of the aluminium content and of other additional elements, but thermal and/or thermomechanical treatments have a high influence on the $\gamma/\alpha_2$ volume ratio in $\gamma$TiAl compounds.

In view of the growing interest in $\gamma$TiAl intermetallic compounds, studies carried out in the last 10 years have identified the ideal composition ranges that provide for a very similar aluminium and titanium content, between 44% and 48%, together with small percentages of other elements that impart specific properties to the resulting intermetallic compound. For further information on intermetallic compounds see, for example, the following publications:

G. Sauthoff "Intermetallics", Weinheim, N.Y. (1995); and

H. Clemens, F. Appel, A. Bartels, H. Baur, R. Gerling, V. Guther, H. Kestler, "Processing and application of engineering g-TiAl based alloys", in Ti-2003 Science and Technology, Volume IV, Wiley-VCH.

The advantages achieved by the use of $\gamma$TiAl intermetallic compounds are principally their low density (3.9-4.2 g/cm$^3$ as a function of their composition), high specific fatigue strength, high specific stiffness, considerable resistance to oxidation and considerable creep strength up to high temperatures. Nonetheless, as has been shown, it is difficult to obtain an article produced with a $\gamma$TiAl intermetallic compound with exactly the composition and structure desired.

A typical example of articles, which can advantageously be produced with a $\gamma$TiAl intermetallic compound, regard gas turbine blades. Besides the difficulties already mentioned concerning obtaining an article produced with the desired material, it must also be borne in mind that these articles require extremely precise machining operations but are difficult to mass produce at reasonable costs with conventional metallurgical techniques, above all due to their extremely complex geometry. A further difficulty lies in the fact that articles of this type must have an extremely low oxygen content, preferably much lower than 1,500 ppm.

Machining from the solid entails very high costs and is therefore unacceptable for mass production. Other known manufacturing techniques for this type of component are just as unprofitable.

For example, the lost wax casting technique can entail a high number of rejects, above all due to the porosities and cracks that are created in articles thus produced and does not allow particularly complex geometries to be obtained.

Another widely used technique is hot pressing, but besides requiring particularly high temperatures and therefore high energy consumption, it is still difficult to obtain complex geometries without requiring several other machining cycles for each article produced.

Neither of these known techniques is therefore able to guarantee the necessary repeatability in the composition of the material, and therefore of the mechanical properties in mass produced articles. This is an essential requisite, above all for mass production of components for engines and/or turbines, in order to guarantee a high level of reliability.

Alternative manufacturing techniques have recently been added to conventional techniques, such as layer by layer manufacturing techniques, which essentially use a focused beam of laser light to obtain melting and/or sintering of successive sections or layers of materials melted by an incident laser light.

These techniques, known for example as "Direct Laser Forming" (DLF) or "Laser Engineered Net Shaping" (LENS), entail a launching system of the metal powders generally integral with the laser light emitter and simultaneous injection of a jet of inert gas (argon), aligned with the laser beam to protect the melting area from oxidation.

Nonetheless, a high degree of turbulence occurs at the melting point due not only to the jet of inert gas, but also to evaporation of metal powders, above all in the case of aluminium powders. In fact, the temperature in the melting chambers is particularly low, in the order of approximately 100° C., but the metal powders have very high melting temperatures, often over 1000° C. The beam of the laser light loses focus making the melting process difficult and evaporation of part of the chemical species with lower melting temperatures compromises the final composition of the article. Moreover, the jet of argon alone in unable to limit oxidation of the article during manufacture to acceptable values.

Consequently, these known techniques cannot be utilized for mass production, nor can they be used to produce articles made of intermetallic compounds, but at the most are usable to produce metal alloy coatings on articles already manufactured ("Laser Cladding" or "Direct Metal Deposition").

Further information on these techniques can be found in the following publications:

"Practical considerations and capabilities for laser assisted direct metal deposition"—G. K. Lewis et al.;

"Laser forming titanium components"—D. H. Abbot et al.;

"Producing titanium aerospace components from powder using laser forming"—F. G. Arcella et al.; and "The optimisation of processing parameters and characterisation of microstructures of direct laser fabricated TiAl alloy components"—D. Srivastava et al.

Patent application WO-0181031 by the applicant ARCAM AB describes a layer by layer manufacturing technique for producing three-dimensional articles. The machine includes a melting chamber in which there is disposed a movable work table on which the article is formed by successive depositions of layers of powders. Each layer of powders laid down in the chamber is melted using a beam of electrons according to the technology known as "Electron Beam Melting" (EBM).

In practice, after having laid down a layer of powders, the emission source of the electron beam is activated to fuse the powders only at one cross section of the three-dimensional article to be formed. Using EBM technology, the machine necessarily operates under high vacuum conditions, thereby reducing the risk of oxidation in the material of the article. This document suggests in particular controlling the temperature in the melting area and modulating the energy of the incident electron beam to prevent vaporization of the melted material.

However, there are no suggestions for particular measures to be taken for the manufacture of articles made of particularly critical materials, such as intermetallic compounds and, in particular γTiAl intermetallic compounds.

SUMMARY OF THE INVENTION

In general, the object of the present invention is to propose a process for mass production of three-dimensional articles produced with intermetallic materials which allow a considerable reduction in production costs with respect to prior art.

Another object of the present invention is to propose a process of the aforesaid type that allows the production of articles made of intermetallic materials based on titanium and aluminium, and in particular articles made of intermetallic compounds of the γTiAl type, also with particularly complex geometries.

These objects are achieved by means of the present invention, which relates to a process for the mass production of three-dimensional articles made of an intermetallic compound through electron beam melting, comprising the steps of:

a) generating a three-dimensional mathematical model of the articles and storing it in a control unit;

b) preparing the powders of the intermetallic compound to be used;

c) laying down a quantity of powders in a melting chamber to form a layer of powders with a regular and substantially uniform thickness;

d) preheating the layer of powders laid down in the melting chamber to a temperature below the melting point of the powders;

e) performing melting by scanning with a focused electron beam in the area corresponding to a cross section of the articles according to the three-dimensional model stored in the control unit;

f) taking the upper surface of the last cross section of the articles thus formed to the level of the powders located in the melting chamber and which are laid down around the portions already formed of the articles; and g) repeating the steps from c) to f) until reaching the last cross section of the articles according to the three-dimensional model stored in the control unit.

According to the process proposed by the present invention, the powders are powders of an intermetallic compound based on titanium and aluminium with the same chemical composition as the final intermetallic compound with which the articles are produced.

EBM technology for layer by layer productions in any case offers several advantages with respect to the technology using a beam of laser light. Firstly, operations are performed in vacuum conditions, thereby reducing contamination of the articles by oxygen and it is possible to operate in temperatures closer to the melting points of the intermetallic compounds.

Moreover, articles made of γTiAl intermetallic compounds have an elongation at break of approximately 1%, but much higher thermal contractions than this percentage. Considering that the melting temperatures of these compounds are approximately 1600° C., the melting technology using a laser light beam could not be applied with success due to the noteworthy thermal gradient between the articles being produced and the surrounding environment maintained at approximately 100° C.

Operating according to the steps of the process, the articles are produced without vaporization of the powders of the initial material or the occurrence of other problems that might influence the composition of the desired material and/or formation of the desired atomic structure.

Therefore, the process is particularly suitable for mass production of articles made of γTiAl intermetallic compounds.

To increase productivity of the process according to the invention, there can be provided a step of cooling the articles at the end of their formation. Cooling can, for example, be implemented by a flow of inert gas, such as helium or mixtures thereof, fed into the melting chamber at a pre-established pressure. In fact, it has been found that controlled cooling, once the temperature of the articles has dropped below approximately 1200° C. does not influence the microstructure of the articles produced using γTiAl intermetallic compounds.

The preheating step d) can, for example, be implemented using only the focused energy beam. Preheating can also be implemented by heating the melting chamber using electrical resistors, the latter placed outside of the melting chamber, or by combining the heating produced by these resistors with that generated by the focused energy beam.

The preheating step d) is preferably implemented at a sufficiently high temperature to cause weak sintering of the powders at least in the area of each cross section of the articles.

In particular, for titanium and aluminium intermetallic compounds, there is provided a preheating step at a temperature of at least 700° C.

During the process set-up steps it has been found that forming by melting without a suitable preheating step can cause the onset of cracks in the finished components and deformation of the layers cast in preceding cycles.

Preferably, the melting step e) starts out with melting performed by the focused electron beam which is guided along the perimeter of the area corresponding to a cross section of the articles.

The melting step 3) then continues by moving the focused energy beam along a transverse scanning path, for example with an angle ranging from 60 to 90 degrees with respect to the one with which the melting step of the cross section below was performed. In particular, for each cross section to be formed, the focused energy beam proceeds along a scanning path constituted by parallel lengths; the parallel lengths of the scanning path followed to form the successive cross section are crossed, i.e. perpendicular, with respect to the preceding lengths.

To produce some articles it may be necessary to provide for the formation of one or more portions to support the cross sections which are formed subsequently. These supporting portions are generally constituted by thin, or less dense, structures, which are produced simultaneously to the article and then removed when the article has been formed.

During the process set-up steps it has in fact been found that the lack of suitable supports can give rise to undesirable deformations.

The powders of the mixture have a grain size ranging from 20 to 150 μm. Below this grain size the powders are too fine and explosions can occur due to the well-known phenomena of self-ignition, while above this range there is an excessive increase in the surface roughness of the articles produced.

The choice of grain size of the powders is substantially a compromise between the maximum production speed, which would favour powders with larger grain sizes, and minimum surface roughness which would favour powders with smaller grain sizes. A grain size suitable for most production processes for articles intended for the motor vehicle and aeronautical industry is around 70 μm.

Powders obtained through gas atomization processes, i.e. processes capable of forming powders with substantially spherical granule, are preferably used. The process is performed by repeating the steps from (c) to (f) several times, forming during each cycle a cross section of the articles with a thickness ranging from 20 to 150 μm, i.e. superposing successive cross sections of the articles until reaching the last section.

The process is advantageously suitable to be applied to produce articles made of intermetallic compounds used principally, although not exclusively, to manufacture gas turbine blades or other components subject to high temperatures, such as turbo compressors, engine valves or the like.

The process according to the present invention allows a plurality of articles all with the same mechanical properties to be produced with extreme precision, regardless of the complexity of the geometry of these articles. Moreover, it is performed in high vacuum conditions, thereby allowing oxidation of the material of the finished articles to be kept very low.

A noteworthy advantage of the process according to the invention lies in the optimal use of the material. In fact, most of the powders that have not been subjected to the melting process can be re-utilized for successive production cycles. The costs for mass production of the articles, regardless of their geometry and the materials with which they are produced, are thus greatly reduced.

The process according to the present invention also allows the production of articles which comply with relatively strict tolerance constraints and which all have the same properties.

BRIEF DESCRIPTION OF THE DRAWINGS

Further advantages and characteristics of the present invention will be more apparent from the description below, provided with reference to the accompanying schematic drawings purely by way of a non-limiting example, wherein:

FIG. 1 is an elevated view of an article that can be produced according to the present invention;

FIGS. 2A-2D represent some steps of the process according to the invention to produce an article such as the one represented in FIG. 1;

DESCRIPTION OF THE PREFERRED EMBODIMENT

Figure 2D:
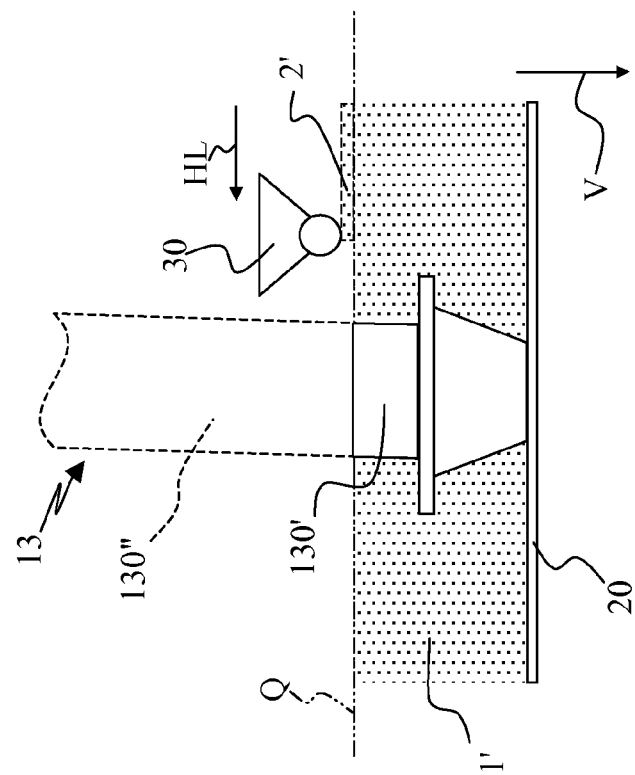
Figure 2C:
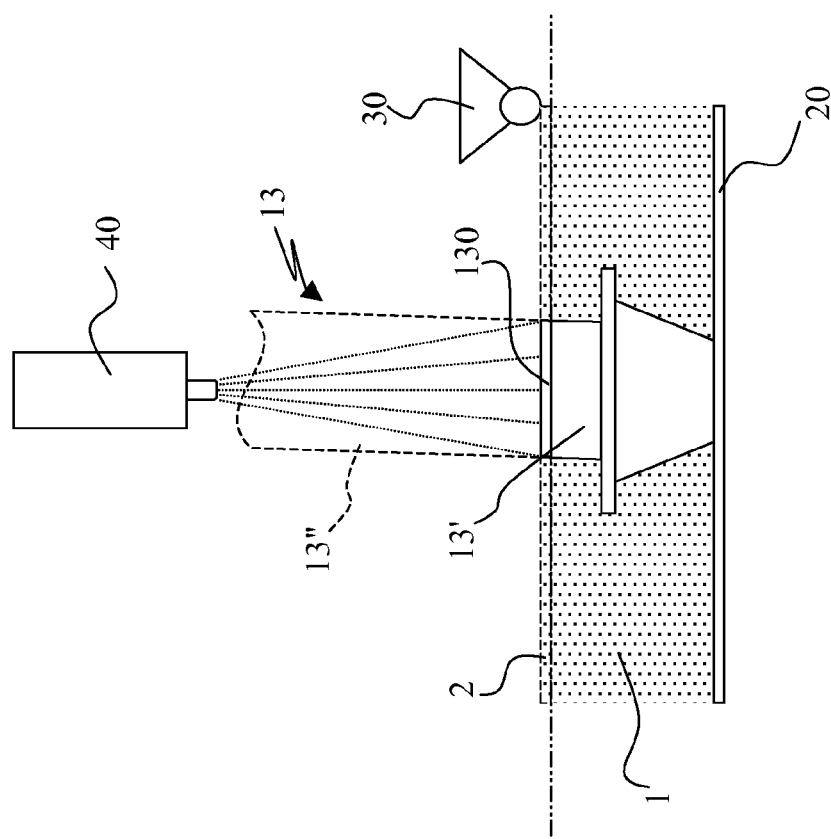

The view in FIG. 1 represents in a greatly simplified form a possible embodiment of a blade 10 for gas turbine comprising a fixing foot 11, a base flange 12 and a wing 13.

In the example, reference is made in particular to a blade 10 made of intermetallic compound, in particular a titanium and aluminium based intermetallic compound of the γTiAl series which is particularly critical to obtain.

To produce the articles with the process according to the invention firstly a three-dimensional model of the articles is generated and stored in a control unit. The mathematical model of the articles can be generated using a computed aided design (CAD) program and transferred in the form of file to the control unit of an electron beam melting machine.

A suitable machine for implementation of the process according to the present invention is, for example, the one identified with the trade name EBM A2 manufactured and distributed by ARCAM AB (Sweden), which allows focused electron beam melting to be performed in high vacuum conditions.

Some steps of the process according to the present invention are represented in FIGS. 2A-2D, where for clarity of representation the production of a single turbine blade has been shown, with views not in scale. However, in actual mass production, a plurality of blades or, in any case, a plurality of the desired articles, are produced. Moreover, although not expressly represented, it must be understood that the process steps shown in FIG. 2A-2D are carried out in the melting chamber of an EBM machine in high vacuum conditions.

FIG. 2A represents an intermediate step in the production of an article like the one represented in FIG. 1. In this step, some portions of the blade 10, in particular the fixing foot 11, the base flange 12 and a portion 13' of the wing are assumed as already produced, while the remaining portion 13" still to be produced is shown with a broken line.

The blade 10 rests on a movable supporting surface 20 which can be controlled to move along the direction represented by the arrow V. The supporting surface 20 is made of a material capable of withstanding the high melting temperatures of γTiAl intermetallic compounds. The supporting surface 20 can be made of nickel based alloys, such as the alloy identified by the trade name Inconel™, which also offers the advantage of not adhering to articles made of γTiAl intermetallic compounds.

The portions of the blade 10 already produced are surrounded by the mass of powders 1 which have already been laid down in successive layers during the preceding steps but have not been subjected to melting. Most of the powders that have not been subjected to melting can then be recovered and re-utilized in subsequent production cycles as no oxidation of the powders occurs as the process is performed in vacuum conditions.

The powders have exactly the same chemical composition as the material with which the articles are to be produced. The powders have a grain size ranging from 20 to 150 μm, more preferably of approximately 70 μm, and are preferably obtained through gas atomization processes so as to form substantially spherical grains.

The powders are disposed in a movable distributor 30 which moves horizontally (arrow HR) and lays down in the melting chamber a layer of powders 2 with a regular and substantially uniform thickness, as shown by way of example in FIG. 2B with the thickness of the layer 2 deliberately exaggerated for reasons of clarity.

The distance between the movable distributor 30 and the surface layer of the powder bath present in the melting chamber can be adjusted so that, during movement thereof, only powders with a grain size that does not exceed the one desired are laid down.

The powders are subjected to a preheating step up to a temperature in any case lower than the melting temperature of the material used. The preheating step can be performed using the same electron beam, or using in combination electrical resistors, placed outside the melting chamber, to aid preheating supplied by the electron beam alone.

Preheating also allows weak sintering to take place between the powders, especially in the area of the cross section of the articles to be subjected to melting.

After completion of the layer of powders 2 (FIG. 2C) the generator 40 of the focused electron beam is activated to initially perform melting of the powders along the perimeter of the area corresponding to the cross section to be formed. The focused energy beam is then guided along a scanning path that covers the area of the section to be formed.

The new cross section 130 is formed over the portion 13' already produced previously following a scanning path with lengths transverse with respect to those with which the section immediately below was formed.

At the end of the melting step, the section 130 is amalgamated with the portion below 13' to form a new portion 130' of the wing 13, as shown in FIG. 2D. With regard to intermetallic compounds based on titanium and aluminium, the temperatures required to obtain melting of the powders in the chamber are generally approximately at least 1500° C. and can even reach 1700-1800° C. as a function of the particular compound used.

The temperature inside the melting chamber is kept under constant control, for example using a thermocouple placed under the supporting surface 20 and extrapolating the temperature of the powder bath in the chamber on the basis of the data relative to the thermal capacity of the materials and to the increasing mass of powders in the chamber. As a function of the temperature detected, it is possible to regulate the energy transmitted to the powders during the preheating and/or melting steps. Regulation can be made in various ways, such as by "defocusing" of the electron beam (dispersion of energy per surface unit), by varying the supply current of the electron beam emitter, by varying the scanning speed of the beam, or by any combination of two or more of these methods.

After the melting step, the movable supporting surface 20 is lowered by a pre-established height (arrow V) substantially corresponding to the thickness of the layer of powders laid down by the distributor 30 at each cycle in the melting chamber. The upper surface of the portion 130', together with the powders 1' now laid down in the melting chamber around the part of the article already formed, is thus taken to the level of a fixed reference height (line Q) with respect to the movable distributor 30.

The movable distributor 30 then starts to move in the opposite direction to lay down a new layer of powders 2' which will then be subjected to melting. The process continues in this way with repetition of the steps to lay down a layer of powders, preheating, melting and lowering of the movable supporting surface 20 until reaching the last section of the three-dimensional model stored in the control unit, i.e. until completing the missing portion 130" of the wing 13.

At each repetition of the steps set forth above a section with a thickness ranging from 20 to 150 μm is formed, as a function both of the grain size of the mixture of powders used, and of the thickness of the layer of powders laid down in the melting chamber by the distributor 30 at each cycle.

At the end of the step to form the articles, cooling can be advantageously be provided by a flow of inert gas in the melting chamber. The inert gas used is preferably helium fed into the chamber at a pressure of approximately 2 bar for a time sufficient to ensure that a temperature which allows removal of the articles from the melting chamber has been reached.

This step allows a considerable reduction in production times to be achieved.

The articles obtained at the end of the process are then subjected to simple mechanical machining to obtained the desired degree of finish. Considering the high precision of the production process according to the invention, only simple and rapid surface finish machining operations are required.

Figure 3:
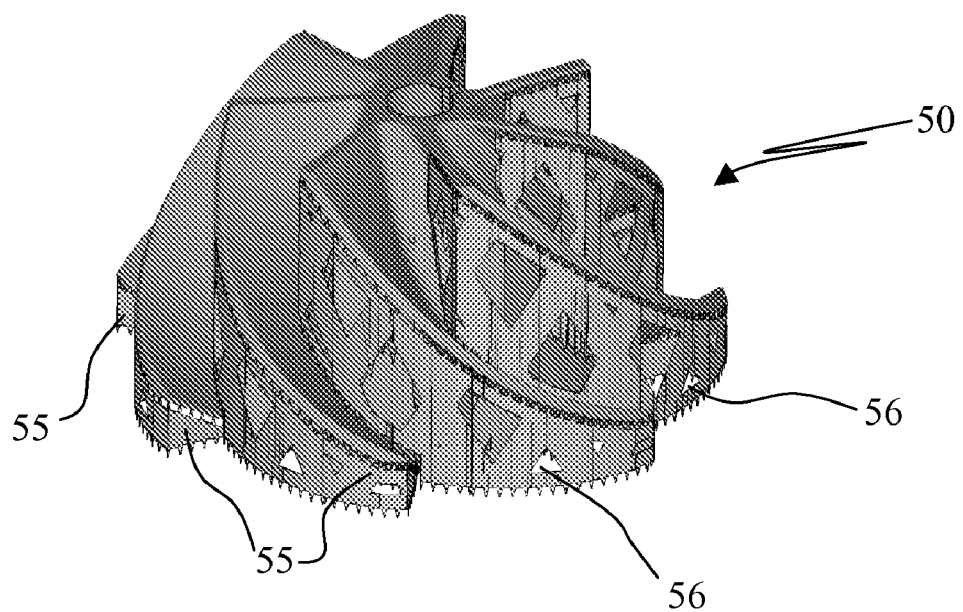
FIG. 3 is a perspective view of an impeller for a turbine produced with a process according to the present invention, in which the supporting portions are highlighted.

FIG. 3 shows an impeller 50 for a turbine after it has been removed from the melting chamber and separated from other identical turbines produced simultaneously.

The impeller 50 comprises the supporting portions 55 which are produced simultaneously to the article and with the same material to facilitate forming flat surfaces during the production process.

Figure 4:
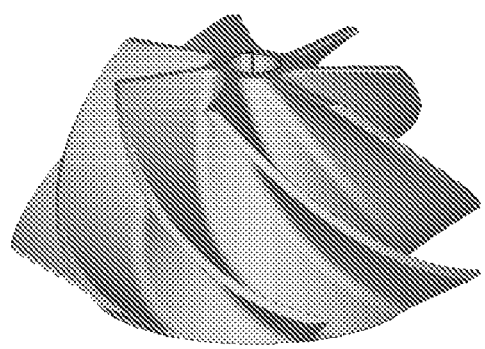
FIG. 4 is a perspective view of the same impeller in FIG. 3 from which the supporting portions have been removed.

The supporting portions 55, for example constituted by very thin walls lightened with slots 56, are nonetheless temporary and are removed prior to the last surface finish steps to obtain the impeller as represented in FIG. 4.

There is now described an example of implementation of a process according to the invention for mass production of articles for turbines.

EXAMPLE 1

Production of Turbine Blades Made of Intermetallic Compounds by Electron Beam Melting Powders of the intermetallic compound γTiAl 48Al-2Cr-2Nb were prepared according to the specifications supplied by General Electric Aviation (USA) to produce low pressure gas turbine blades. The intermetallic compound used has a melting temperature of approximately 1550° C.

The powders were loaded into the distributor located inside the melting chamber of a EBM machine identified by the abbreviation A2 and manufactured by ARCAM AB (Sweden).

The preheating step was performed using only the focused electron beam until taking the powders to a temperature of approximately 900° C.

The mathematical model used was configured for the simultaneous production of 30 turbine blades all with the same properties of geometrical shape and dimensions.

The production process, performed under high vacuum, required a total of approximately 30 hours to complete production and cooling in a helium atmosphere.

The 30 blades were then separated and the supporting portions (such as those represented by way of example for the impeller in FIG. 3) were removed before subjecting the blades to surface finish machining operations to remove a surface layer (machining allowance) of approximately 0.2 mm. It was estimated that, using a process according to the present invention, the mass production costs of the blades for gas turbines made of γTiAl intermetallic compounds can be reduced by about four times with respect to mass production costs using conventional processes.

Although the process of the present invention has been presented for the mass production of components for turbines, it must be understood that the principles of the present invention can be applied equally to the mass production of other components for engines or the like made of intermetallic compounds, obtaining the same advantages listed above in terms of cost and quality of the articles produced.

What is claimed is:

1. A process for the mass production of three-dimensional articles made of an intermetallic compound based on titanium and aluminium by electron beam melting, comprising the steps of:
    a) generating a three-dimensional mathematical model of said articles and storing it in a control unit;
    b) preparing the powders of said intermetallic compound with a same chemical composition as a final intermetallic compound with which said articles are produced;
    c) laying down a quantity of said powders in a melting chamber to form a layer of powders with a regular and substantially uniform thickness;
    d) preheating said layer of powders laid down in said melting chamber to a temperature below the melting point of said powders;
    e) performing melting by scanning with a focused electron beam in the area corresponding to a cross section of said articles according to the three-dimensional model stored in said control unit;
    f) taking the upper surface of the last cross section of said articles thus formed to the level of the powders located in said melting chamber and which are laid down around the portions already formed of said articles;
    g) repeating said steps from c) to f) until reaching the last cross section of said articles according to the three-dimensional model stored in said control unit, said powders being powders of an intermetallic compound based on titanium and aluminium with the same chemical composition as the final intermetallic compound with which said articles are produced; and
    h) performing a final cooling step of said articles at an end of their formation in an inert gas atmosphere, the cooling step being performed by feeding the inert gas into the melting chamber once a temperature of the articles has dropped below about 1200° C.

2. The process as claimed in claim 1, wherein said powders and said articles are made of γTiAl intermetallic compounds.

3. The process as claimed in claim 1, wherein said inert gas is constituted by helium or mixtures thereof.

4. The process as claimed in claim 1, wherein said preheating step d) is performed entirely or partly by scanning with a focused electron beam.

5. The process as claimed in claim 1, wherein said preheating step d) is performed entirely or partly by heating said melting chamber using electrical resistors.

6. The process as claimed in claim 1, wherein said preheating step d) is performed at a sufficiently high temperature to cause weak sintering of the powders at least in the area of each cross section of said articles.

7. The process as claimed in claim 1, wherein said preheating step d) is performed at a temperature of at least 700° C.

8. The process as claimed in claim 1, wherein said melting step e) is performed by moving said focused electron beam along a transverse scanning path with an angle ranging from 60 to 90 degrees with respect to the one with which the melting step of the cross section below was performed.

9. The process as claimed in claim 1, wherein said melting step e) initially includes melting with focused electron beam along the perimeter of the area corresponding to a cross section of said articles.

10. The process as claimed in claim 1, wherein said melting with focused electron beam in said step e) is performed maintaining at least said melting chamber in high vacuum conditions.

11. The process as claimed in claim 1, wherein during each repetition of said steps from c) to f) there is provided the formation of one or more portions to support the cross sections which are formed successively.

12. The process as claimed in claim 11, wherein there is provided removal of said one or more supporting portions after said articles have been formed.

13. The process as claimed in claim 1, wherein the grain size of said powders ranges from 20 to 150 μm.

14. The process as claimed in claim 1, wherein the grain size of said powders is approximately 70 μm.

15. The process as claimed in claim 1, wherein said powders are obtained by gas atomization processes.

16. The process as claimed in claim 1, wherein at each cycle to repeat the steps from c) to f) there is formed a cross section of said articles with a thickness ranging from 20 to 150 μm.

* * * * *